July 23, 1957 R. KOBLER 2,800,531

REMOTELY-CONTROLLED PHONOGRAPHIC SYSTEM

Filed June 15, 1954 4 Sheets-Sheet 1

INVENTOR
Richard Kobler
BY George H. Fritzinger
Agt.

INVENTOR
Richard Kobler
BY George H. Fritzinger
Att.

INVENTOR
Richard Kobler
BY George H. Fritzinger
Agt.

July 23, 1957 R. KOBLER 2,800,531

REMOTELY-CONTROLLED PHONOGRAPHIC SYSTEM

Filed June 15, 1954 4 Sheets-Sheet 4

INVENTOR
Richard Kobler
BY George H. Fritzinger
Agt.

United States Patent Office 2,800,531

Patented July 23, 1957

2,800,531

REMOTELY-CONTROLLED PHONOGRAPHIC SYSTEM

Richard Kobler, New York, N. Y., assignor, by mesne assignments, to McGraw-Edison Company, Elgin, Ill., a corporation of Delaware Application June 15, 1954, Serial No. 436,796

19 Claims. (Cl. 179—6)

This application is a continuation-in-part of my application Serial No. 331,566 filed January 16, 1953, entitled "Remotely-Controlled Phonographic System" and abandoned with the filing of this application.

The present invention relates to a remotely-controlled phonographic system for recording and reproducing dictation. Particular novel features of my invention reside in the provision of a novel backspace limiter to prevent one user from playing back dictation recorded on a record by a previous user, and further in providing novel mechanism and circuits for controlling the system during playback.

The invention is especially applicable to dictation-recording systems of the type wherein one dictating machine is adapted to serve a plurality of remote dictators' stations such, for example, as is disclosed in the copending Somers et al. application Serial No. 247,244, filed September 19, 1951 and having common ownership with the present application (now Patent No. 2,757,238 dated July 31, 1956). However, no unnecessary limitation of the invention to this particular type of remotely-controlled phonographic system is intended.

In the remotely-controlled dictation-recording system described in the above Somers et al. application, each remote dictator's station is connected to the machine by four wires, two of which form a combined audio and control circuit and the other two of which form a signaling circuit. Each remote station may comprise a handset typically of a telephone variety, a signal light, and controls for recording and for playback. In the typical arrangement of each dictator's station, lifting of the handset from its support will condition the machine for operation and cause the signal lights to go on at all remote stations wherefore to indicate that the machine is in use. When the dictator returns his handset to its support, the machine becomes available for other dictators. If the first dictator has not used substantially the entire record on the machine, the second dictator will continue his dictation on the same record. However, when the recordation has proceeded to a predetermined point on the record, an attendant at the machine is signalled to change the record as in the manner described in the aforementioned Somers et al. application.

Dictation-recording systems are adapted to enable the carriage for the translating devices to be backspaced to enable playback of selected portions of dictation so that the dictator may, for example, reconstruct in his mind the train of his thoughts in case he has been interrupted during his dictation. In remotely-controlled systems of the type permitting successive dictators to record on the same record, it is highly desirable that one dictator be prevented from playing back the dictation of the previous user. This limitation on playback is important not only as a step in achieving privacy of dictation but also to prevent confusion of the dictator should he inadvertently backspace farther than intended into the recordation area of the previous dictator. An object of my invention is to provide a backspace limiter which is adapted to prevent backspacing of one dictator into the region of the previous dictator's recording. Further objects of my invention are to provide such limiter controlled by a normal act performed by the dictator as he finishes recordation of a dictation unit such as a letter, memorandum or the like, or as he finishes using the machine. Such acts may be the making of a length mark to signify the end of a dictation unit, or the operation of an on-off station switch to "off" position as by the return of the handset to its support, to make the machine available for other users.

Other objects of my invention are to provide a means for defining or registering the starting position of the carriage each time a dictator initiates use of the machine, and for preventing with the aid of such defining means the playback of any recorded dictation on the record back of the last such starting position, the defining means being under control of a manual switch, preferably a station switch operable by the handset as the handset is placed onto and removed from its support.

In order particularly to minimize the number of leads required between the dictators' stations and the dictating machine, while preserving all of the usual controls made generally available to the dictator, the station switch abovementioned is utilized not only for activating the machine for use and deactivating it to make it available for others, respectively as the dictator picks up his handset and as he returns it to its support, but also for making a length mark each time the station switch is operated. It may frequently occur, however, that the dictator will dictate several dictation units during a dictation period reckoned from the time he activates the machine for his own use until the time he makes the machine available to others; yet he will want to make a length mark at the end of each dictation unit for the benefit of the transcriber.

An object of my invention is to enable the dictator to make a length mark only, or to make a length mark and concurrently to activate or deactivate the machine by selective operation of the station switch.

Another object is to enable the dictator to make a length mark within a dictation period while preserving a facility for playing back all of his dictation recorded within that period but without enabling playback of any dictation recorded in a prior dictation period.

Another object is to provide a carriage defining means and an indexing means both controlled by a common reciprocable switch in such manner that with each momentary reciprocation of the common switch only the indexing means is operated but that with operation of the switch in one direction accompanied by a suitable delay before it is returned in the other direction both the indexing means is operated and the defining means is conditioned to prevent playback of all dictation recorded in positions of the carriage back of that which the carriage occupied when the defining means was so conditioned. A further object in this respect is to cause the machine to be deactivated only upon expiration of a predetermined time period following the operation of the common switch in said one direction.

Specific features of the illustrative embodiments of my invention for achieving the aforestated objectives reside (1) in providing a rear marker for the movable carriage of the machine, which is controlled to define during the recordation of each dictation unit the starting position of the carriage for that unit, (2) in causing such rear marker to be locked in position each time the handset is lifted from its support, (3) in preventing the carriage from being backspaced past the position defined by the rear marker while the rear marker is locked, (4) in causing, as shown in one embodiment of my invention, the rear marker to be advanced to the carriage either as the handset is returned to its support or as a length mark is made, or both, and (5) in causing, as shown in a second and preferred embodiment of my invention, a length mark to be made upon each reciprocation of the station switch and in causing, in addition, the rear marker to be advanced to the carriage and then again locked whenever there is a pause following the return of the station switch to "off" position before it is again moved to "on" position. A further feature of my second and preferred embodiment resides in providing a delay circuit to prevent the defining means from registering the position occupied by the carriage until the station switch is returned to "off" position and delayed in that position for a moment or so before being again returned to "on" position, the purpose being to enable any desired control operation to be performed by any momentary reciprocation of the station switch without repositioning the defining means.

After backspacing the carriage to play back a selected portion of the recorded dictation, the carriage must be returned to its previous position of farthest advance and the machine must be restored to condition for recording, before recordation of dictation can be resumed. This conditioning for further recordation poses special problems in remotely-controlled machines, especially should a dictator return his handset to its support to complete a dictation period while the carriage is in a backspaced position. Further objects of my invention are to provide novel improvements in remotely-controlled dictation-recording systems for effectively solving these problems.

Another object of the invention is to provide novel means for raising and automatically holding the recording stylus above the record until the carriage has been moved at least to its previous most-advanced position.

A further object of my invention is to provide novel supervisory means for the attendant of the machine adapted to prevent any misoperation of the system arising from or as a result of its remotely-controlled backspacing means.

These and other objects and features of my invention will be apparent from the following description and the appended claims.

In the description of my invention reference is had to the accompanying drawings, of which:

Figure 1:
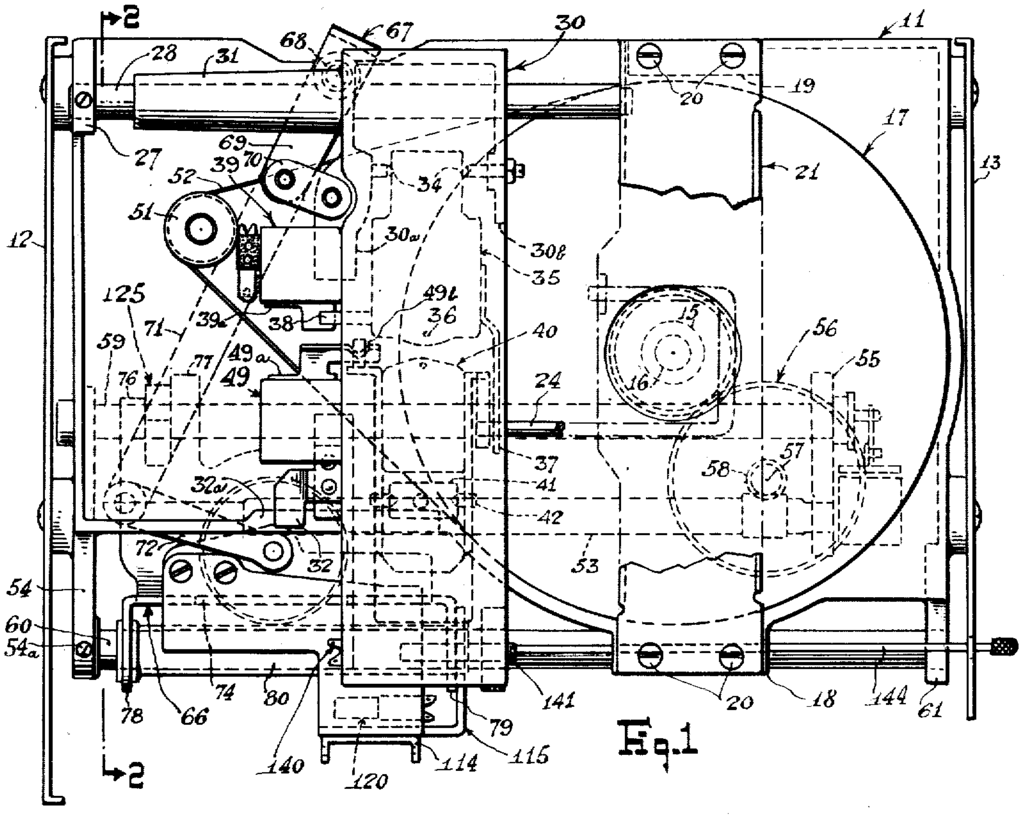
Figure 1 is a plan view of a dictating machine in which my invention has been incorporated.
Figures 2, 10:
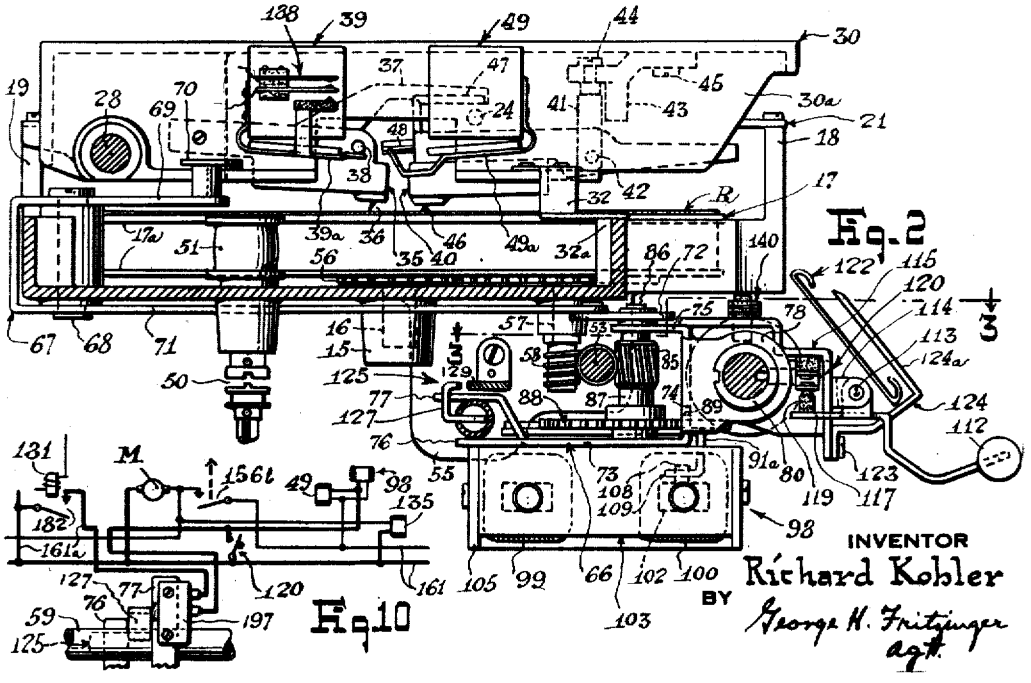
Figure 2 is a cross section taken substantially on the line 2—2 of Figure 1.
Figure 10 is a diagrammatic view illustrating a revision of the system of Figure 9.

For purposes of illustration, my invention is herein described in connection with a dictating machine substantially as shown in the Wann et al. Patent 2,533,359 dated December 12, 1950. Such machine has a main frame plate 11 supported on the side plates 12 and 13 as shown in Figure 1. The frame plate 11 is provided with a bearing 15 in its central right-hand portion in which there is journalled a depending shaft 16 of a turntable 17 (Figures 1 and 2). In positions diametrically opposite the turntable are front and back standards 18 and 19 integral with the frame plate 11. Mounted on these standards and secured thereto by screws 20 is a bridge 21 partially shown in dash-dot lines in Figure 1. This bridge spans the turntable and carries a record-clamping mechanism which need not however be herein described. Reference may however be had to Dann et al. Patent 2,524,561 dated October 3, 1950 for a description of such clamping mechanism. For the present purpose, it is sufficient to state that the mechanism clamps a disc record R to the turntable by engaging its central portion, and that it operates a lifting rod 24, partially shown in dash-dot lines in Figures 1 and 2, to raise and lower this rod as a record is unclamped and clamped respectively. In the present mechanism, the rod 24 is utilized to control the lowering and raising of both the recording and reproducing translating units in relation to the record as will appear.

At the rear of the frame plate 11 there is a laterally-extending rod 28 mounted between a standard 27 and the bridge 21, which rod supports the rear portion of a carriage 30 for the aforementioned translating units. The carriage 30 has a long bearing 31 slidably fitting this rod and has a forward foot 32 resting slidably on a rail 32a upstanding from the frame plate 11. This supporting means permits lateral traveling movement of the carriage along the lefthand portion of the rod. The carriage is provided with a top wall having a depending flange 30a along its full length at its left side and having a similar such flange 30b along only the rear portion thereof at its right side. Within the rearward portion of the carriage there is pivoted at 34 a recording type translating unit 35 hereinafter referred to simply as a recorder. This recorder has a stylus 36 adapted for forming a groove in the record R. Extending forwardly from the right side of the recorder is a lift arm 37 which overlies the aformentioned rod 24. When the record-clamping mechanism is unactuated, the rod 24 abuts against the arm 37 to prevent lowering of the recorder onto the record, but as the clamping mchanism is actuated the rod 24 is lowered to permit the recorder to engage the record in response to operation of other control means hereinafter described. One such other control means comprises a lift pin 38 projecting from the left side of the recorder, which is engageable by the armature 39a of an electromagnet 39 to retain the recorder in raised position from the record under certain conditions hereinafter described.

Within the forward portion of the carriage there is a reproducing type translating unit 40 hereinafter referred to simply as a reproducer. The reproducer is pivoted to a block 41 on horizontal cone pivots 42, and the block is in turn pivoted to a bracket 43 by a vertical pivot screw 44. The bracket 43 is rigidly secured to the carriage by a screw 45. The reproducer is thus supported universally for both vertical and lateral movement of its stylus 46 relative to the record R. At the free end of the reproducer there is a lift arm 47 which overlies the rod 24 so that the reproducer, like the recorder, may be lowered onto the record only when the record-clamping mechanism is actuated. The reproducer has also a lift pin 48 extending rearwardly from the left side thereof which is operable by the armature 49a of an electromagnet 49 for holding the reproducer raised from the record under certain conditions hereinafter described.

Figure 9:
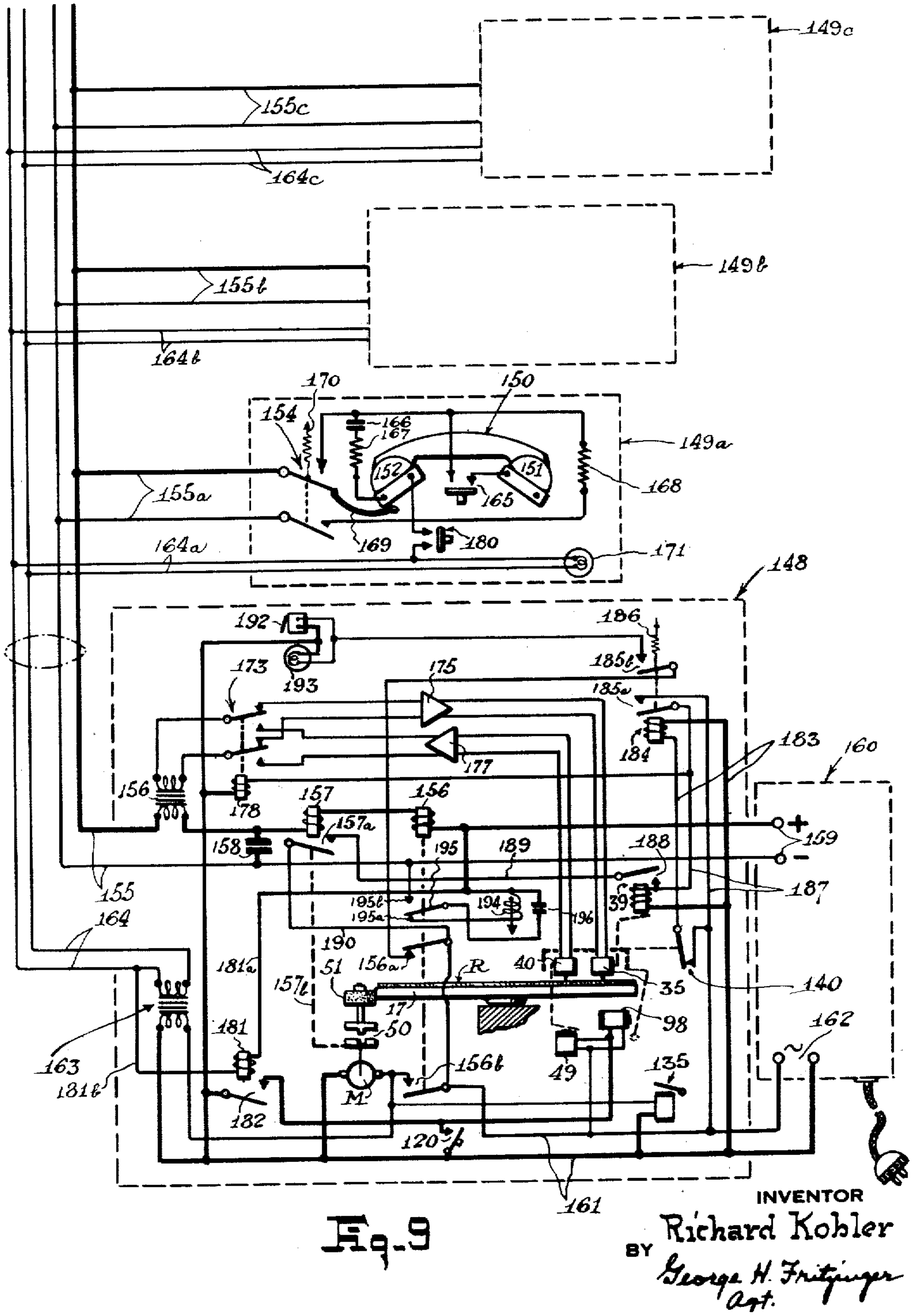
Figure 9 is a diagrammatic view of a multistation remotely-controlled phonographic system in which my invention is incorporated.

The driving mechanism for turning the turntable and effecting simultaneous traveling movement of the carriage 30 comprises a motor M diagrammatically shown in Figure 9. The motor is coupled through a clutch 50 to a drive pulley 51 that is journalled in the frame plate 11 (Figures 1 and 2). This pulley is coupled directly to the turntable 17 by a belt 52 which rides in a peripheral groove 17*a* of the turntable. The carriage 30 is driven by the turntable through a drive transmission comprising a laterally-extending feed screw 53 journalled at its ends in standards 54 and 55 depending from the frame plate 11. The shaft 16 of the turntable is coupled by a gear train 56 (Figure 1) to a vertical shaft 57 journalled to the frame 11, and this shaft is coupled by spiral gearing 58 (Figures 1 and 2) to the feed screw to cause the feed screw to be turned whenever the turntable is rotated. At the back side of the feed screw and in parallel relation thereto is a tubular support rod 59 supported at its ends by the standards 54 and 55, and at the front side of the feed screw there is a rod 60 supported at its left end by the standard 54 and at its right end by a standard 61 depending from the frame 11, the latter rod 60 being held in place by a set screw 54*a* threaded into the standard 54. A lower carriage 66 is slidably mounted on the support rods 59 and 60 for progressive movement along the feed screw 53. This carriage 66 constitutes a traveling support for an indexing head as well as for other controls of the machine, as is hereinafter described.

It is to be observed that the upper carriage 30 is moved only to the extent of traversing the recording area of one side of the record disc R but that the carriage 66 is desirably moved through a much greater range. In order that these carriages may be so proportionately moved, they are intercoupled by a linear transmission comprising a U-lever 67 which embraces the frame 11 from the rear end thereof and is pivoted to this frame by a pivot screw 68. This lever has a short upper arm 69 above the frame coupled to the carriage 30 by a link 70, and has a long arm 71 below the frame coupled to the carriage 66 by a proportionately longer link 72.

The carriage 66 comprises a main flat horizontal portion 73 having an upwardly-extending front portion 74 from the upper edge of which extends a rearward lug 75 parallel to the main portion. At the rear of the main portion 73 there are lower and upper extensions 76 and 77 which embrace slidably the aforementioned support rod 59. The front vertical portion 74 has forwardly-projecting ears 78 and 79 at its ends, which are apertured to receive a sleeve 80. The sleeve is suitably rigidly secured to the carriage and is slidably mounted on the support rod 60 for free back and forth traveling movement therealong.

Figures 3, 4, 5, 6, 7, 8:
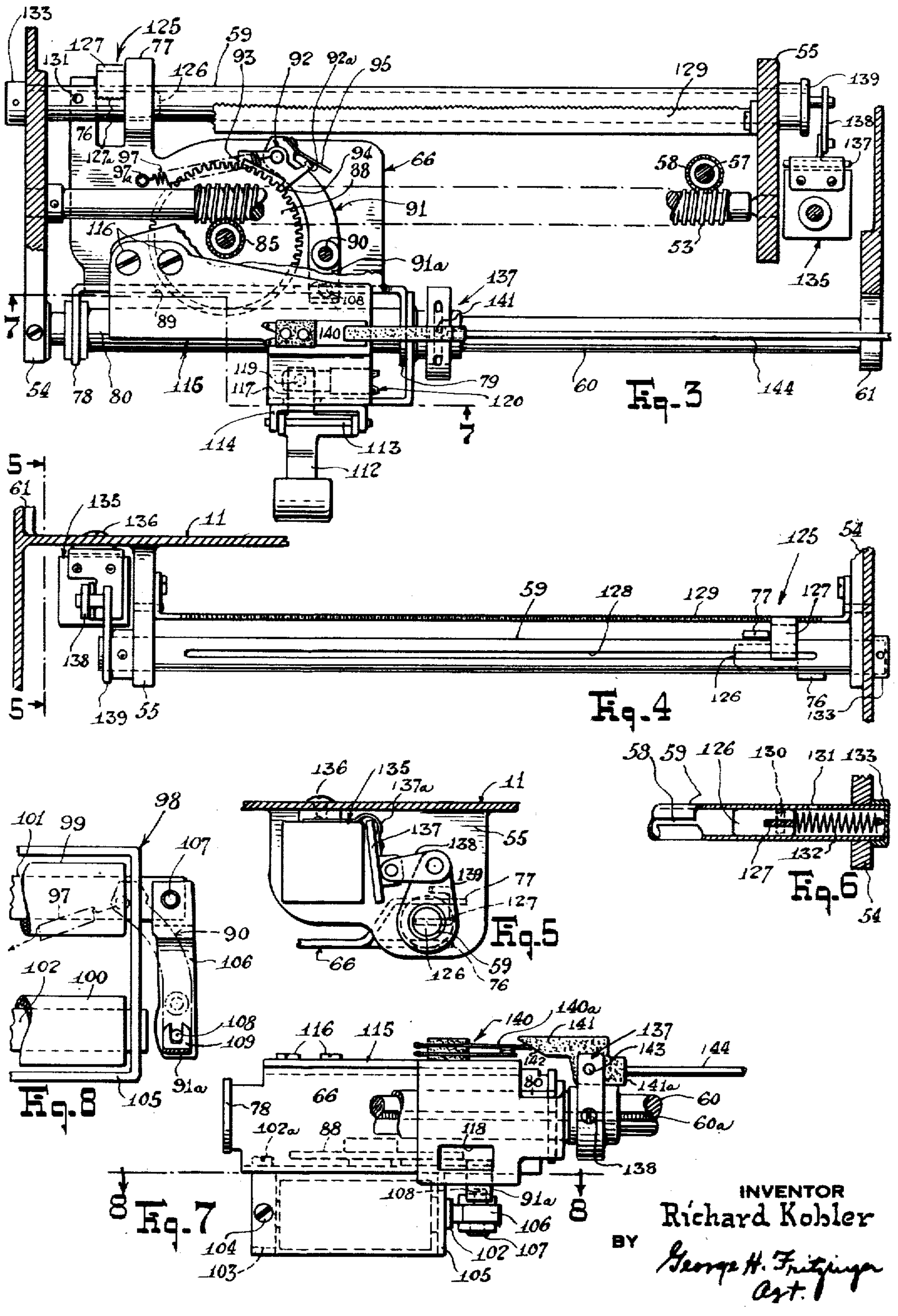
Figure 3 is another cross section taken substantially on the line 3—3 of Figure 2.
Figure 4 is a partial rear view of the machine shown in Figure 3, to illustrate details of construction and mode of operation of the rear marker for the carriage.
Figure 5 is a detailed view of operating means associated with the rear marker, as seen from the line 5—5 of Figure 4.
Figure 6 is a fractional view of the right end portion of the machine shown in Figure 4 with parts broken away.
Figure 7 is a partial front view of the indexing head of the present machine, taken substantially on the line 7—7 of Figure 3.
Figure 8 is a fractional sectional view taken substantially on the line 8—8 of Figure 7.

Movement of the carriage 66 by the feed screw 53 is imparted through a circular feed nut 85 mounted on a pivot rod 86 held at its end by the lower plate 73 and the upper lug 75 of the carriage. (It is to the upper end of this pivot rod that the aforementioned link 72 is pivotally secured as shown in Figure 2.) The feed nut 85 has a shaft 87 to which is secured a toothed wheel or gear 88. This gear is relatively large in diameter and extends through an opening 89 in the front wall of the carriage. As is best shown in Figure 3, there is pivoted at 90 to the right side of the gear 88 a rock lever 91. A pawl 92 is pivoted at its center to the free end portion of this lever. This pawl has teeth 93 and 94 at its opposite ends for engaging the gear 88. The pawl is urged clockwise, as it appears in Figure 3, by a cantilever spring 95 into a limit position relative to the lever defined by the abutment of a stop lug 92*a* of the pawl against the lever. The lever is itself urged counterclockwise by a tension spring 97 connected between the free end portion thereof and a pin 97*a* on the carriage 66. The arrangement is such that when the lever 91 is rocked clockwise against the tension of the spring 97, the pawl 92 is totally disengaged from the gear 88 and is moved by the spring 95 into an angular position wherein the innermost tooth 94 thereof will first engage the gear when the lever 91 is released. Following such initial engagement of the gear by the tooth 94 as the lever 91 is released, the gear is turned clockwise by the peripheral distance between two successive teeth and thereupon the second tooth 93 of the pawl engages also the gear to latch the gear in its actuated position. This clockwise movement of the gear causes the feed nut 85 to backtrack along the feed screw to backspace the carriage 66 and the carriage 30 by one step for each actuation and release of the lever 91. Thus, upon each reciprocation of the rock lever 91, the carriage 66 is first unlatched with respect to the feed screw, is next backspaced one step and is then again latched to the feed screw. It is by successively actuating the lever 91 that the carriage is backspaced step by step to the desired position. Of course, when the gear 88 is latched the feed screw will progressively advance the carriages along their paths of travel during rotation of the turntable.

The means for moving the lever 91 clockwise comprises an electromagnet 98 having two coils 99 and 100 provided with respective iron cores 101 and 102. Each of these cores is riveted at one end to an iron bar or yoke 103 (Figures 2 and 7). The yoke is secured by screws 102*a* to the underside of the carriage 66 to support the electromagnet 98 in a horizontal plane. A U-member 105 of non-magnetic material is joined at its ends to the yoke by screws 104 to form a complete envelope around the two coils. The base of this U-member is apertured to receive the ends of the cores 101 and 102 opposite the yoke (Figure 8). One of the cores 101 extends beyond the member 105 and has an armature 106 pivoted thereto at 107. The free end of the armature is movable to and from the other core and carries thereon an upstanding pin 108 shown in Figures 2, 3 and 7. This pin engages a fork 109 in a depending and reversely bent end portion 91*a* of the lever 91, the fork being offset downwardly below the plate 73 of the carriage 66. The armature is normally held spaced from the core 102 by the spring 97 acting on the lever 91. When the electromagnet 98 is energized, however, the armature is drawn against the core 102 to disengage the pawl 92 from the gear 88. When the current supply of the electromagnet is next cut off, the spring 97 reengages the pawl 92 with the gear 88 to effect a backspacing step of the carriage in the manner abovedescribed.

At the front of the machine there is a hand lever 112 pivotally mounted at 113 on a small bracket 114. This bracket is riveted to a larger bracket 115 which is secured by screws 116 to the carriage 66 (Figures 1, 2, 3 and 7). The lever 112 has an inward extension 117 which passes through a suitable opening 118 in the bracket 115 and which carries an upstanding pushbutton 119 effective to close a switch 120 when the lever is pressed downwardly. The switch 120 is mounted insulatedly on the under side of the bracket 115 and is connected in the circuit of the electromagnet 98 (Figure 9) so that when the switch is closed the electromagnet is energized to unlatch the gear 88 wherefore to enable the carriage 66 to be freely moved by hand through its range of travel.

Mounted at the front of the frame 11 and overlying the forward portion of the bracket 115 is a holder 122 for an index slip not shown. Secured at 123 to the member 115 is a bracket 124 which extends forwardly past the under side of this holder. This bracket has a pointer 124*a* adapted to serve as an indicator to enable the attendant to see at a glance the position of the carriage 66 with respect to its range of travel. Also, this bracket serves to support the usual annotating devices for making marks on the index slip; however, such devices need not be herein shown.

According to my invention a playback limiting means is provided to prevent a subsequent user of the recording system from playing back the recorded dictation of the previous user. By way of illustration, this limiting means is one associated with the carriage backspacing means to prevent the translating devices from being moved back beyond the positions which they occupied at the start of recordation of a dictation unit. The limiting means may comprise, for example, a rear marker 125 for the carriage 66 in the form of a plunger 126 mounted slidably within the tubular carriage-supporting rod 59 for movement throughout the range of travel of the carriage. Secured to and projecting upwardly from this rear marker through a slot 128 in the tubular rod 59 lengthwise thereof is an arm 127 shown in Figure 4. As is shown in Figure 6, the arm 127 is secured to the plunger 126 by a pin 130 which is inserted in place through a side opening 131 in the tube 59 after the plunger is installed in the tube. The arm 127 extends into the path of the extension 77 of the carriage 66 to the rear thereof (Figures 1 and 2). The rear marker is urged rightwardly as it appears in Figure 3 by a compression spring 132 interposed between it and a cap 133 pinned to the left end of the tubular rod 59. In response to the action of this spring, the rear marker tends always to follow the carriage with the arm 127 thereof in abutment with the carriage extension 77.

The rear marker may however be locked in position to define any previous position of farthest advance of the carriage, and for this purpose the arm 127 has a forwardly-extending end portion terminating in a toothed edge 127a for engagement with a confronting rack 129 extending along the full length of the support rod 59 and supported at its ends by the standards 54 and 55. To lock the rear marker in position the tubular support rod 59 is turned on its central axis, in a clockwise direction as it appears in Figure 2, to engage the arm 127 with the rack 129. This turning is effected by an electromagnet 135 secured by screws 136 to the under side of the frame 11. The armature 137 of this electromagnet is spring-hinged at 137a to normally retain it in unoperated position shown in Figure 5. The armature is connected by a link 138 to an upstanding arm 139 pinned to the left end of the rod 59. Upon energization of the electromagnet 135 the armature is operated to turn the rod 59 and engage the marker with the rack. As will appear, the electromagnet 135 is energized automatically as an incident to activating the machine for use from any one of the remote stations, wherefore to lock the rear marker in the position which it then occupies, and the electromagnet is deenergized as an incident to the subsequent restoration of the machine to unactivated condition wherefore to release the rear marker from its locked position and cause its forward advance to the carriage by the spring 132.

On the support rod 60 to the right of the carriage 66 there is an advance marker 137. This marker is in the form of a collar slidably mounted on the rod 60 and held against turning relative thereto by means of a screw 138 which engages a groove 60a lengthwise of the rod. By this engagement, suitable friction is provided between the marker and the rod so that the marker is normally held fixed in position except when it is forcibly moved by the carriage or by hand. Normally, the reduced left-hand side of the marker is in abutment with the sleeve 80 of the carriage 66 to cause the marker to be advanced with the carriage. Mounted on the bracket 115 of the carriage 66 is a switch 140 whose upper blade 140a is extended for engagement by the marker 137. For this purpose the marker has a finger 141 provided with a camming face 142 effective to press against the blade 140a of the switch and hold the switch closed while the marker is in abutting relation with the carriage. The finger 141 is made of insulating material such as Bakelite and is secured to the collar by a cross pin 143 and by abutment of the lower edge thereof against the bottom edge of the slot in the collar into which the finger is fitted. Secured to the advance marker at 141a is a long rod 144 by which the advance marker 137 can be moved manually along the rod by the attendant of the machine. This rod projects outwardly from the cabinet of the machine and has a hand knob on its outer end portion (Figure 1).

In the remotely-controlled system illustrated in Figure 9, the recording machine 10 is placed at an attendant's station 148 and is connected to a plurality of remote dictators' stations in the manner hereinbefore described. For purposes of illustration three such stations are diagrammatically shown and referred to as 149a, 149b and 149c, but only one station 149a is shown in detail since its description will suffice for all three. The dictators' stations are connected in parallel to the recording machine by means of two branch circuits leading from each station. One branch circuit is referred to by the number 155 with the suffix letter of the respective station and constitutes a combined communication and control circuit. The other branch circuit is referred to by the number 164 with the suffix letter of the respective station and constitutes a signaling circuit. All branch communication circuits are connected to a main communication circuit 155 of the recording machine, and all branch signaling circuits are connected to a main signaling circuit 164 of the machine.

The station 149a includes a handset 150 of the usual telephone variety including, as transducer elements, a carbon button microphone 151 and a receiver 152. The receiver 152 is connected in parallel with a resistor 168 through a blocking condenser 166 and a resistor 167, and the microphone 151 is connectable in parallel with this resistor 168 through a normally open start-stop switch 165. This parallel arrangement is connectable by a double-pole on-off station switch 154 to the respective branch communication circuit. The station switch is biased closed into "on" position as by a spring 170, and is coupled to a supporting element for the handset, represented by a hook extension 169 on one pole element of the switch, so that when the handset is placed on its support either for the purpose of making a length mark to designate the end of a dictation unit, as is later described, or to terminate use of the machine, the switch will be opened to disconnect the receiver and microphone from the respective branch communication circuit. The remote station 149a has also a signal light 171 connected permanently in the branch circuit 164a, and has a playback control switch 180 biased open and connected between the negative side of the branched communication circuit via the station switch and one side of the branch signaling circuit.

For control purposes the communication circuit 155 includes serially connected relays 156 and 157. Energizing current for these relays and for the carbon button microphone is obtained from a low-voltage direct-current source supplied by way of terminals 159 (marked + and −) of a power pack generally referred to as 160. Audio currents from the remote stations are bypassed around these relays through a condenser 158.

The relays 156 and 157 are adapted to operate respectively at lower and higher levels of direct current established selectively at the dictator's station. Relay 156 has normally-closed contacts 156a, normally-open contacts 156b, and a pole 196 normally closed with contact 195a and closable with contact 195b as the relay is energized. The contacts 156b are in a power circuit 161 for the motor M. This power circuit is connected to an A.-C. source derived from the terminals 162 of the power pack 160. Thus, the motor is caused to run whenever the relay 156 is energized.

The second relay 157 has normally-open contacts 157a and has further an operative connection 157b (represented by dotted lines) to the clutch 50. When this relay is energized at the higher level of current it closes contacts 157a and engages the clutch 50. Thus record rotation is started whenever both relays 156 and 157 are energized.

In the power circuit 161 and in shunt with the motor M is a voltage stepdown transformer 163 the secondary of which is connected to two outgoing leads constituting the signal circuit 164. The signal circuit is accordingly energized to cause the signal lights to go on at all dictators' stations whenever the motor M is started.

Upon picking up the handset 150, the station switch 154 is closed to cause energization of the communication circuit from the D.-C. source through the resistor 168. The direct current which is so established in the communication circuit causes the relay 156 to close the switch **156*b*. Closure of this switch causes the motor M to be connected across the A.-C. source 162 to start the motor and also connects the signal transformer across this A.-C. source to energize the signal lights 171 at all dictators' stations. Also, closure of the switch 156*b* connects the electromagnet 135 across the A.-C. source to lock the rear marker 125 in the position which the carriage then occupies. Upon pressing the manual switch 165, the carbon button microphone 151 is connected also in the communication circuit in shunt with the resistor 168; this increases the level of the direct current in the communication circuit to cause the relay 157 to operate. Operation of this relay causes the clutch 50** to be engaged to start record rotation.

Serially connected in the communication circuit 155 at the attendant's station 148 is the primary of an audio transformer 156 the secondary of which is connectable by a double-pole switch 173 either to the recorder 35 through the amplifier 175 or to the reproducer 40 through the amplifier 177. The switch 173 is part of a relay 178, and occupies normally its recording position shown in Figure 9. When the relay is energized the switch is moved to reproducing position to connect the audio transformer to the reproducer.

Upon closing the playback control switch 180 at the remote station an energizing circuit for a relay 181 is completed from the positive terminal of the D.-C. source 159 through a lead **181*a*, the coil of relay 181, and a lead 181*b* to one side of the signal circuit 164 and branch signal circuit 164*a*, thence through the playback control switch 180, one pole of the on-off station switch 154 and the negative side of the branch communication circuit 155*a* and main communication circuit 155 to the negative terminal of the D.-C. source 159. Energization of the relay 181 closes contacts 182 to connect both the aforedescribed electromagnets 49 and 98 across the A.-C. source 162. As the electromagnet 49 is energized its armature 49*a* is raised against the lift pin 48 to raise the reproducer from the record (Figures 1 and 2). At the same time the reproducer is centered by reason of a V-notch 49*b* in the armature where it engages the lift pin. The energization of the electromagnet 98 causes the lever 91 to be rocked clockwise (Figure 3) to withdraw the pawl 92 from the gear 88. This withdrawal causes the pawl to be cocked by a spring 95 so that when the playback control switch is next opened, the resultant return of the lever 91 by the spring 97 will cause the gear 88 to be turned clockwise through the peripheral distance of one tooth (Figure 3) with proportionate backspacing of the carriages. Thus, each time the playback control switch 180 is closed and reopened, the reproducer is lifted and centered, and the carriages are stepped back a short distance. Repeated closure of the playback control switch 180 will successively step back the carriages and center the reproducer during each step of backspacing. After any such backspacing, pressing the start-stop switch 165** will cause the forward advance of the carriages to be resumed but until the carriages are returned to their position of farthest advance the machine will be conditioned for reproducing, as will appear.

The carriage 66 cannot be backspaced beyond the rear marker 125 defining the position of the carriage at the start of the particular dictation unit, for once the carriage abuts against the rear marker the spring 97 which propels the lever 91 upon each release thereof to produce each backspacing step, merely operates to urge the carriage against the marker without any forcing action. Pressing the start switch 165 to resume the forward advance of the carriages while the carriage 66 is abutted against the rear marker will result in immediate forward thrust on the feed nut 85 with resultant slight turning of the feed nut until the pawl 92 relocks the gear 88 and thereafter normal advance of the carriage for playback will proceed.

Before the carriage 66 is backspaced—i. e., so long as it is in positions of farthest advance—the cam finger 141 on the advance marker bears against the switch blade **140*a* of the switch 140 on the carriage 66 to cause the switch to be held closed. As shown in Figure 9, so long as the advance marker switch 140 is closed, a relay 184 is energized through a circuit 183 from the A.-C. source 162. This relay 184 has contact pairs 185*a* and 185*b* which are biased closed as by a spring 186 but which are held open, as shown, so long as the relay 184 is energized. However, in the initial backspacing of the carriage 66, switch blade 140*a* leaves the cam finger 141 of the advance marker, the switch 140 is opened and the relay 184 is deenergized to cause the contact pairs 185*a* and 185*b* to close. Closure of the contact pair 185*a* completes an energizing circuit 187 for the electromagnet 39 from the A.-C. source 162. As this electromagnet is operated its armature 39*a* is raised against the lift pin 38 of the recorder to move the recorder from the record (Figures 1 and 2). Thus, the recorder is held raised from the record so long as the carriage 66** is backspaced from a position of farthest advance.

An additional result of the closure of the switch contact pair **185*a* is to complete an energizing circuit for the record-reproduce relay 178 wherefore to move the switch 173 to reproduce position. Thus, the audio circuits of the machine are connected for reproducing so long as the carriage 66** is backspaced from a position of farthest advance.

When, during playback, the carriage approaches its former position of farthest advance, it is necessary to assure that the recorder be not lowered onto the record before the carriage reaches that position, else the recorder will destroy the last portion of the recording. In fact, as whenever the reproducer stylus is set back a small distance from the recorder stylus in respect of the direction of advance of the carriage—which is typically the case so that the last few words or sentence of one's dictation may be played back without backspacing the carriage—it is necessary to be able to maintain the machine in playback condition for such short distance of travel of the carriage beyond its previous position of farthest advance. In accordance with my invention, I am able to do so, and to maintain the recorder off the record until the previous recording is played back to the very end, without fail, by a novel means which withholds the recorder from the record until return of the start-stop switch to stop position after the carriage has passed its previous position of farthest advance. This means comprises a switch 188 of the electromagnet 39 which is held closed so long as the electromagnet is energized. This switch 188 is in a holding circuit for the electromagnet 39, which circuit is connected from one side of the A.-C. source 162 through the electromagnet 39, switch 188, lead 189, switch **157*a* of the relay 157 and lead 190 back to the other side of the A.-C. source 162. Thus, although the electromagnet 39 was original energized via the switch 185*a* of the relay 184, its final energization after opening of switch 185*a* following reclosure of the advance marker switch 140, is via the above holding circuit. However, as soon as the dictator nears the end of his recording, he will release his start-stop switch 165 with resultant deenergization of the relay 157 and opening of switch 157*a*** to open this holding circuit and cause the recorder to be lowered again onto the record.

If the dictator should hang up his handset while the carriage is in a backspaced position—such for example as might happen if at the end of his dictation he backspaces merely to check some intermediate point of his recordation, is satisfied as to that point and then hangs up—a special signal is sent to the attendant, to warn that the carriage must now be manually advanced to its prior position of farthest advance to enable a succeeding dictator to continue operation of the machine. This warning is in the form of both a light from a lamp 193 and a sound signal from a buzzer 192. These two signal devices are connected in parallel with each other in a circuit across the A.-C. source 162 through both the switch **185*b* of the relay 184 and switch 156*a* of the relay 156. As before explained, the switch 185*b* is closed only while the carriage is in a backspaced position and the switch 156*a* is closed only as the dictator hangs up his handset to deenergize the relay 156**. Thus, the attendant is warned to advance the carriage to the position of the advance marker only when the dictator hangs up his handset to discontinue use of the machine while leaving the carriage in a backspaced position.

Dictating machines are provided typically with indicating devices—themselves well known—for making length and correction marks as on a suitable index slip to aid the transcriber in transcribing the recorded dictation. Especially, in remotely-controlled machines, these marking devices are operated by respective solenoids. One such solenoid 194 is herein shown for making length marks. This solenoid is controlled by the relay 156. For this purpose this relay has a third pole 195 operable between contacts **195*a* and 195*b*. When the relay 156 is operated—which occurs as the handset is lifted from its support to close the station switch—the pole 195 makes with the contact 195*b* to connect a condenser 196 across the direct-current supply 159. When the pole 195 makes with the contact 195*a*—which occurs when the station switch is opened as by placing the handset on its support—the condenser 196 is connected across the solenoid 194** to cause a pulse operation thereof to make a length mark. Thus, a length mark is made each time the handset is returned to its support or, more basically, each time the station switch is opened. Each such length mark is made to indicate the end of a dictation unit. Since in the normal use of the machine the station switch is opened and closed between successive dictation units, the rear marker will be advanced to the position of the carriage and then locked in that position each time a length mark is made and operation of the machine is resumed.

Whenever a record is to be changed on the machine, the feed nut 85 is unlocked by pressing the lever 112 to close the switch 120, the carriages are manually returned to start positions, and the advance marker is returned into abutting relation with the carriage 66. Such return of the advance marker is facilitated by the rod 144 projecting beyond the right side of the machine as hereinbefore described.

A modified arrangement of backspace-limiting control, effected however by the same rear marker 125, is shown in Figure 10. In this embodiment a pushbutton switch 197, preferably of the type sold as microswitches, is mounted on the carriage extension 77 with its pushbutton extending beyond its left side in line with the arm 127 of the rear marker. The switch 197 is biased closed but is openable by pressure of the rear marker against the pushbutton; also, this switch is connected serially in the alternate energizing circuit **161*a* for the electromagnet 98 via the switch 182 of the relay 181. Operation of the remote playback switch 180 while the carriage is ahead of the rear marker will operate the electromagnet 98 to effect backspacing in the normal way hereinbefore described since the switch 197 will be then closed. However, as the carriage is backspaced against the rear marker the switch 197 is opened to prevent further operation of the backspacing electromagnet 98** by the remote playback switch, wherefore to place a limit on backspacing by remote control. This does not however prevent the attendant from operating the backspacing electromagnet

98 to unlock the feed nut 85 for manual return of the carriage, by the lever 112, since the switch 120 controlled by this lever is not in the alternate energizing circuit **161*a***.

Figure 11:
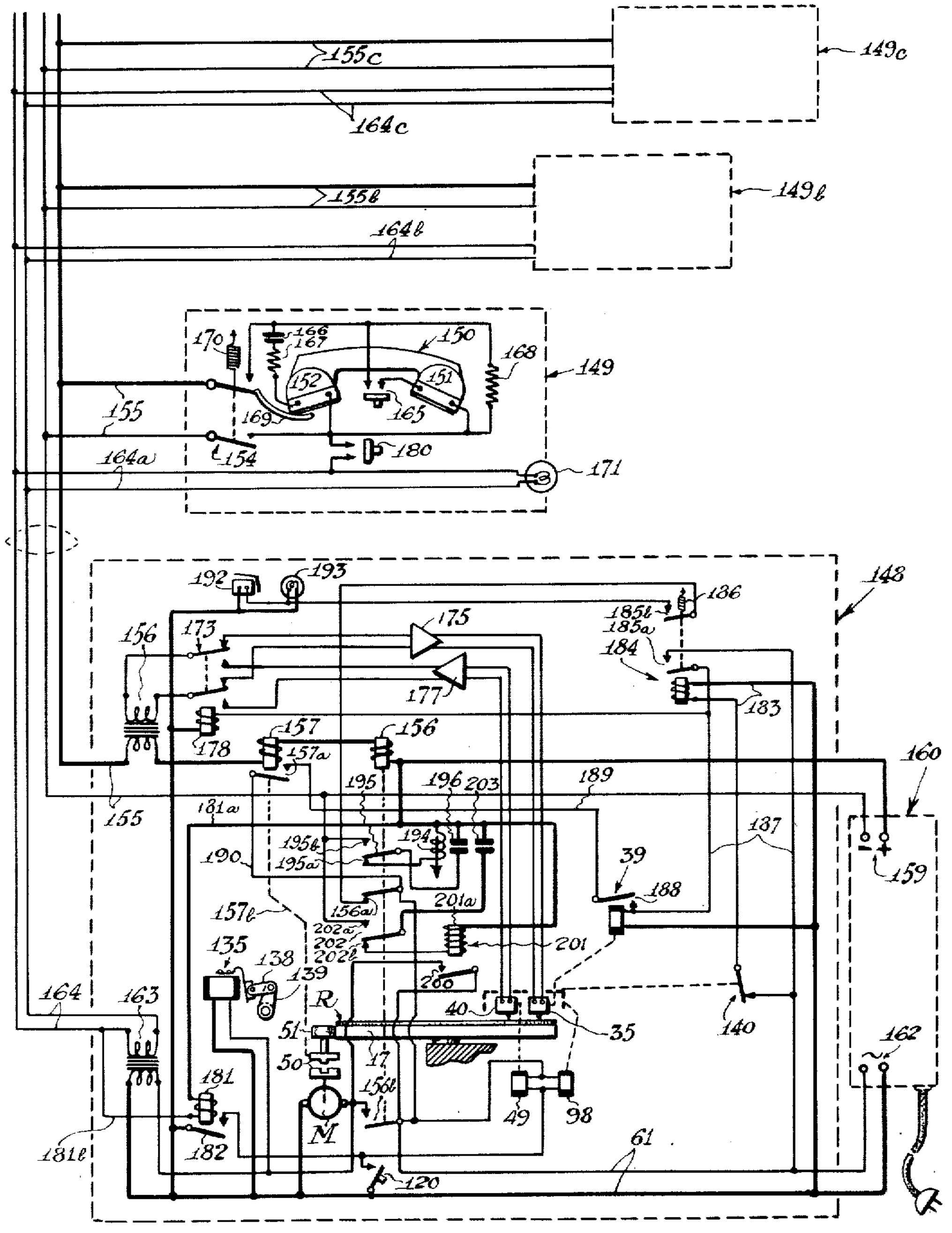
Figure 11 is a diagrammatic view, similar to Figure 9, but showing a modified form of my invention adapted to enable length marks to be made within any one dictation period, by means of the on-off station switch, without deactivating the machine or operating the backspace limiter.

In the modified embodiment of my invention shown in Figure 11, the mechanism and circuits of my previous embodiments are retained but a delay means is added to cause the machine to be deactivated and the rear marker released from a locked condition only upon elapse of at least a few moments following return of the station switch 154 to "off" position before the station switch is again moved to "on" position. On the other hand, the length marker is actuated immediately upon return of the station switch to "off" position, the same as before. Accordingly, any momentary reciprocation of the station switch to "off" position and back to "on" position will cause a length mark to be made but will not deactivate the machine or release the rear marker from its locked condition. A length mark may therefore be made at any time during a dictation period and at the same time there is preserved the facility to backspace the carriage to its starting position for that period and to enable playback of any and all portions of the recorded dictation made within that dictation period.

The delay means abovementioned comprises a switch 200 connected in parallel with the motor switch **156*b*. Switch 200 is part of a relay 201 the coil of which is connected through contact 202*b* of a single-pole double-throw switch 202 across condenser 203. The switch 202 is added as part of the relay 156 and makes with contact 202*b* whenever the relay is not energized. If the relay 156 is energized by closure of any one of the station switches 154, the switch 202 makes with contact 202*a* to shift the connection of the condenser 203 from across the relay coil 201 to across the D.-C. source 159**. The operation of the delay circuit is accordingly as follows:

As soon as any dictator picks up his handset to cause his station switch 154 to move to "on" position, the condenser 203 becomes energized in addition to all of the functions performed in my previous embodiments. Thereafter, when the dictator returns his handset to its support, the condenser 203, which is now charged, is connected across the relay coil 201 to cause this relay to be operated for a time period determined by the time-discharge characteristic of the circuit 201—203. During such momentary operation of the relay 201, the switch 200 is closed not only to prevent the motor from stopping but also to maintain the electromagnet 135 energized so that the rear marker will not be unlocked. Since the length marker 194 is operated immediately upon return of the handset to "off" position, a length mark can be made without effecting any other control operation simply by setting the handset on its support and immediately picking it up again—which is a normal act to perform when the dictator intends only to make a length mark. Since the rear marker remains locked while a length mark is so made, the dictator has not destroyed his facility to backspace and listen back through the whole portion of his dictation recorded during the current dictation period. However, upon returning the handset to its support and leaving it there to mark the end of his dictation period, the motor is stopped and the rear marker is released and advanced to the position of the carriage so that when a subsequent dictator activates the machine from one or another of the remote stations, the rear marker will be again locked at the position then occupied by the carriage to make it impossible for that dictator to listen back to the recorded dictation of the previous dictator.

The embodiments herein particularly shown and described to illustrate my invention are not necessarily limitative of my invention since the same are obviously subject to many changes and modifications without departure from the true scope of my invention, which I endeavor to express according to the following claims.

I claim:

1. In a dictation-recording system, including an attendant's station, a dictating machine at said attendant's station including a rotatable record-supporting device, a record-cooperating translating device, a carriage for one of said devices mounted for traveling movement of said one device relative to the other, and means for advancing said carriage: the combination of a dictator's station including a transducer, a start-stop control for said advancing means and a station switch; means for connecting said transducer, start-stop control and station switch to said machine; means for defining selected previous positions of farthest advance of said carriage while the carriage is farther advanced comprising a rear marker mounted for traveling movement, means for moving said rear marker in corresponding relation to the movement of said carriage as the carriage is advanced, a locking means for holding said rear marker fixed in its path of travel while said carriage occupies farther positions of advance; and means controlled by said station switch for rendering said locking means effective and ineffective.

2. The combination set forth in claim 1 including carriage backspacing-control means at said dictator's station; means controllable by said backspacing-control means for backspacing said carriage; and means including said rear marker and effective when said marker is locked by said locking means for preventing backspacing of said carriage of said backspacing means past the previous position of farthest advance of said carriage defined by said rear marker.

3. In a dictation-recording system including an attendant's station, a dictating machine at said attendant's station including a rotatable record-supporting device, a record-cooperating translating device, a carriage for one of said devices mounted for traveling movement of said one device relative to the other and means for advancing said carriage: the combination of a remote dictator's station including a transducer, a carriage backspace-control means and a station switch; means operative upon closure of said station switch for connecting said transducer and carriage backspace-control means to said dictating machine; power means at said machine controlled by said backspace-control means for backspacing said carriage; a rear marker for said carriage mounted for traveling movement; means for causing said rear marker to be moved in corresponding relation to the movement of said carriage during advance of the latter; means for holding said rear marker fixed in its path of travel while said carriage occupies farther positions of advance; means rendered effective by said station switch as the switch is closed for rendering said holding means effective; and means associated with said marker and effective while said marker is under the influence of said holding means for disabling said power backspacing means upon backspacing said carriage to the position it occupied when said station switch was closed.

4. In a dictation-recording system including an attendant's station, a dictating machine at said attendant's station including a rotatable record-supporting device, a record-cooperating translating device, a carriage for one of said devices mounted for traveling movement of said one device relative to the other and means for advancing said carriage: the combination of a remote dictator's station including a transducer, a carriage backspace-control means and a station switch; means operative upon closure of said station switch for connecting said transducer and carriage backspace-control means to said dictating machine; reciprocatable ratchet means for intermittently backspacing said carriage including power means rendered effective upon each closure of said backspace-control switch to cock said ratchet means, and spring means connected to said ratchet means and effective upon each opening of said backspace-control switch to advance said ratchet means and effect a step backspacing of said carriage; and means for preventing power backspacing of said carriage past the position occupied thereby when said station switch was closed, comprising a rear marker mounted for traveling movement directly behind said carriage as the carriage is advanced, means normally effective to retain said rear marker in abutting relation to said carriage, locking means for holding said rear marker locked while said carriage occupies farther positions of advance wherefore to form a rear abutment for blocking backspacing movement of said carriage by said spring means past the position occupied by the carriage when said rear marker was locked; and means controlled by said station switch to render said locking means effective and ineffective respectively as said station switch is closed and opened.

5. In a dictating machine including a record-supporting device, a record-cooperable translating device, a carriage for one of said devices mounted for traveling movement of said one device relative to the other, and means for advancing said carriage: the combination of a rear marker for said carriage mounted for traveling movement; abutment means in the path of said rear marker and connected to said carriage for movement along said path in corresponding relation to the movement of the said carriage; spring means constantly urging said rear marker forwardly towards said abutment means; locking means for said marker including a member extending along the path of traveling movement of said marker and a cooperating locking member on said marker effective to lock the marker to said member in any selected position of the marker; and means for operating said locking member to hold said rear marker fixed in its path of travel whereby upon farther advance of said carriage said marker defines a selected previous position of farthest advance of the carriage.

6. In a dictation-recording system including an attendant's station, a dictating machine at said attendant's station including a rotatable record-supporting device, a record-cooperating translating device, a carriage for one of said devices mounted for traveling movement of said one device relative to the other, and means for advancing said carriage: the combination of a dictator's station including a transducer and a station switch; means for connecting said transducer and station switch to said dictating machine; a length marking means at said machine; means controllable by said station switch for operating said length marking means to make a length mark; means for defining selected previous positions of farthest advance of said carriage while the carriage is farther advanced relative thereto comprising a rear marker mounted for traveling movement, means for causing movement of said marker in corresponding relation to the movement of said carriage as the carriage is advanced, and means for holding said rear marker locked in its path of travel while said carriage occupies farther positions of advance; and means controlled by said station switch incidental to making each length mark by said length-marking means for operating said defining means to cause said rear marker to be locked at the position of said carriage.

7. In a dictation-recording system including an attendant's station, a dictating machine at said attendant's station including a rotatable record-supporting device, a record-cooperating translating device, a carriage for one of said devices mounted for traveling movement of said one device relative to the other, and means for advancing said carriage: the combination of a dictator's station including a transducer and a station switch; means for connecting said transducer and station switch to said dictating machine; means for defining selected previous positions of farthest advance of said carriage while the carriage is farther advanced relative thereto comprising a rear marker mounted for traveling movement, abutment means in the path of said rear marker and connected to said carriage for movement along said path in corresponding relation to the movement of said carriage, spring means urging said rear marker forwardly towards said abutment means, means for holding said rear marker in position while said carriage occupies farther positions of advance, and means controlled by said station switch as said switch is closed for rendering said holding means effective; a length-marking means at said machine; and means controlled by said station switch as said switch is opened for producing a pulse operation of said length-marking means.

8. In a dictation-recording system including an attendant's station, a dictating machine at said attendant's station including a rotatable record-supporting device, a record-cooperable translating device, a carriage for one of said devices mounted for traveling movement of said one device relative to the other, and means for advancing said carriage: the combination of a dictator's station including a transducer, a start-stop control switch for said machine, a backspace-control switch and an on-off station switch; means controlled by said station switch for connecting said transducer, start-stop control switch and backspace-control switch to said dictating machine when said station switch is closed; an advance marker mounted for traveling movement; means for moving said advance marker in corresponding relation to the movement of said carriage as said carriage is advanced; power means controlled by said backspace-control switch for backspacing said carriage from positions of farthest advance defined by said advance marker; an attendant's signaling means; and means controlled by said advance marker and said station switch for rendering said signaling means operative upon return of said station switch to open position while said carriage is backspaced from a position of farthest advance.

9. The combination set forth in claim 8 including switch means controlled by said advance marker according to whether or not said carriage is in a position of farthest advance or backspaced therefrom; an energizing circuit for said attendant's signaling means; and relays controlled by said station switch and advance marker switch respectively, said relays having respective switches in said energizing circuit to cause said circuit to be closed only when said carriage is in backspaced relation to said advance marker and said staion switch is in open position.

10. In a dictation-recording system including an attendant's station, a dictating machine at said attendant's station including a rotatable record-supporting device, a recorder and reproducer, a carriage device for said recorder and reproducer, means mounting one of said devices for traveling movement of said recorder and reproducer relative to the record, and power means for advancing said one device: the combination of a dictator's station including a start-stop control switch for said advancing means and a backspace-control switch; power means for backspacing said one device; means for connecting said start-stop control switch and said backspace-control switch to said advancing means and backspacing means respectively; an advance marker mounted for movement with said one device and moved thereby as said one device is advanced; electrically-operable lifting means energizable to raise said recorder from the record; circuit means controlled by said advance marker for energizing said lifting means so long as said one device is backspaced from a position of farthest advance; and other circuit means including switch means controlled by said lifting means and electrically-operated switch means controlled by said start-stop control switch for maintaining said lifting means energized after return of said one device to said position of farthest advance while said start-stop control switch is in start position.

11. In a dictation-recording system including an attendant's station, a dictating machine at said attendant's station including a rotatable record-supporting device, a recorder and reproducer, a carriage device for said recorder and reproducer, means mounting one of said devices for traveling movement of said recorder and reproducer relative to the record, and power means for advancing said one device: the combination of a dictator's station including a transducer, a start-stop control switch for said machine, a backspace-control switch, and an on-off station switch; means controlled by said station switch for connecting said transducer, start-stop control switch and backspace-control switch to said dictating machine when said station switch is closed; an advance marker mounted for travelling movement; means for causing said advance marker to be moved in corresponding relation to the movement of said carriage as said carriage is advanced; power means controlled by said backspace-control switch for backspacing said carriage from positions of farthest advance defined by said advance marker; electromagnetic means for withholding said recorder from the record; circuit means controlled by said advance marker for energizing said electromagnetic means while said carriage is backspaced from said advance marker; and a holding circuit for said electromagnetic means including a switch operated closed by said electromagnetic means as the same is energized and further including electrically-operated switch means operated closed upon movement of said start-stop control switch to start position for maintaining said electromagnetic means energized after return of said carriage to its position of farthest advance so long as said start-stop control switch is retained in start position.

12. In a dictation-recording system including an attendant's station, a dictating machine at said attendant's station including a rotatable record-supporting device, a record-cooperating translating device, a carriage for one of said devices mounted for traveling movement of said one device relative to the other, and means for advancing said carriage: the combination of a dictator's station including a transducer and a station switch; means for connecting said transducer and station switch to said dictating machine; and means for defining selected previous positions of farthest advance of said carriage while the carriage is farther advanced relative thereto comprising a rear marker mounted for traveling movement, abutment means in the path of said rear marker and connected to said carriage for movement along said path in corresponding relation to the movement of said carriage, spring means urging said rear marker forwardly towards said abutment means, means for holding said rear marker in position while said carriage occupies farther positions of advance, and means controlled by said station switch as said switch is closed for rendering said holding means effective.

13. In a dictation-recording system including an attendant's station, a dictating machine at said attendant's station including a rotatable record supporting device, a transducer means operable selectively for recording and reproducing, a carriage device for said transducer means, means mounting one of said devices for traveling movement of said transducer means relative to the record, and power means for advancing said one device: the combination of a dictator's station including a start-stop control switch for said advancing means and a backspace-control switch; power means for backspacing said one device; means for connecting said start-stop control switch and said backspace-control switch to said advancing means and backspacing means respectively; an advance marker mounted for traveling movement; means for causing said advance marker to be moved in corresponding relation to the movement of said one device as said one device is advanced; electrically-operable means energizable to render said transducer means inoperative for recording; circuit means controlled by said advance marker for energizing said electrically-operable means so long as said one device is backspaced from a position of farthest advance; and other circuit means including switch means controlled by said electrically-operable means and switch means controlled by said start-stop control switch for maintaining said electrically-operable means energized after return of said one device to said position of farthest advance until said start-stop control switch is returned to stop position.

14. In a dictation-recording system including an attendant's station, a dictating machine at said attendant's station including a record-supporting device, a record-cooperable translating device, a carriage for one of said devices mounted for traveling movement of said one device relative to the other, and means for advancing said carriage: the combination of a plurality of dictators' stations and interstation wiring for connecting the dictators' stations to the said dictating machine; apparatus at each dictator's station for operating said dictating machine to record dictation, said apparatus at each dictator's station including an on-off station switch normally in "off" position and effective for connecting certain elements of said apparatus to said machine via said interstation wiring to enable recordation and playback of dictation from the station while the respective station switch is in "on" position; means controlled by said station switches respectively for defining, while the carriage is farther advanced, the position which the carriage occupied when the station switch was operated to "on" position; and means controlled by said defining means for rendering said machine inoperative to reproduce any recorded portion of the record back of the last prior position of the carriage defined by said defining means.

15. The combination set forth in claim 14 including length-marking means; and means for controlling said length-marking means by said station switches respectively.

16. In a dictation-recording system including an attendant's station, a dictating machine at said attendant's station including a record-supporting device, a record-cooperable translating device, a carriage for one of said devices mounted for traveling movement of said one device relative to the other, and means for advancing said carriage: the combination of a plurality of dictators' stations and interstation wiring for connecting the dictators' stations to said dictating machine; apparatus at each dictator's station for operating said dictating machine to record dictation, said apparatus at each dictator's station including an on-off station switch normally in "off" position and effective for connecting certain elements of said apparatus to said machine via said interstation wiring to enable recordation and playback of dictation from the station while the respective station switch is in "on" position; means for defining selected previous positions of farthest advance of said carriage while the carriage is farther advanced relative thereto; means for causing said defining means to register the position of said carriage when a station switch is moved from "off" to "on" position; and means controlled by said defining means for rendering said machine inoperative to reproduce recorded portions of the record back of the last registered previous position of said carriage.

17. In a dictation-recording system including an attendant's station, a dictating machine at said attendant's station including a record-supporting device, a record-cooperable translating device, a carriage for one of said devices mounted for traveling movement of said one device relative to the other, and means for advancing said carriage: the combination of a plurality of dictators' stations and interstation wiring for connecting the dictators' stations to said dictating machine; apparatus at each dictator's station for operating said dictating machine to record dictation, said apparatus at each dictator's station including an on-off station switch normally in "off" position and effective for connecting certain elements of said apparatus to said machine via said interstation wiring to enable recordation and playback of dictation from the station while the respective station switch is in "on" position; means for defining selected previous positions of farthest advance of said carriage while the carriage is farther advanced relative thereto; means including time-delay means for causing said defining means to register the position of said carriage only upon a shift to a first condition wherein all of said station switches are in "off" position followed by a shift after at least a predetermined time delay to a second condition wherein at least one of said station switches is in "on" position; and means controlled by said station switches respectively for effecting a control operation on said machine upon a shift from one of said conditions to the other.

18. In a dictation-recording system including an attendant's station, a dictating machine at said attendant's station including a record-supporting device, a record-cooperable translating device, a carriage for one of said devices mounted for traveling movement of said one device relative to the other, and means for advancing said carriage: the combination of a plurality of dictators' stations and interstation wiring for connecting the dictators' stations to the said dictating machine; apparatus at each dictator's station for operating said dictating machine to record dictation, said apparatus at each dictator's station including an on-off station switch normally in "off" position and effective for connecting certain elements of said apparatus to said machine via said interstation wiring to enable recordation and playback of dictation from the station while the respective station switch is in "on" position; a defining means for registering selected previous positions of said carriage during subsequent advance thereof; means including time-delay means for causing said defining means to register the position of the carriage when a station switch is returned to "off" position and thereupon after at least a predetermined time delay one of said station switches is moved to "on" position; means for rendering said machine inoperative to reproduce recorded portions of the record back of the last registered previous position of said carriage; indexing means; and means controlled by said station switches respectively for causing operation of said indexing means upon shifting a station switch from "on" to "off" position.

19. In a dictation-recording system including an attendant's station, a dictating machine at said attendant's station including a record-supporting device, a record-cooperable translating device, a carriage for one of said devices mounted for traveling movement of said one device relative to the other, and means for advancing said carriage: the combination of a plurality of dictators' stations and interstation wiring for connecting the dictators' stations to the said dictating machine; apparatus at each dictator's station for operating said dictating machine to record dictation, said apparatus at each dictator's station including an on-off station switch normally in "off" position and effective for connecting certain elements of said apparatus to said machine via said interstation wiring to enable recordation and playback of dictation from the station while the respective station switch is in "on" position; a defining means for registering selected previous positions of said carriage during subsequent advance thereof; means including time-delay means for causing said defining means to register the position of the carriage when a station switch is returned to "off" position and thereupon after at least a predetermined time delay one of said station switches is moved to "on" position; means for rendering said machine inoperative to reproduce recorded portions of the record back of the last registered previous position of said carriage; length-marking means; and means responsive to momentary reciprocation of said one station switch from "on" position within the time interval of said time delay for operating said length-marking means.

References Cited in the file of this patent

UNITED STATES PATENTS

| | | |
|---|---|---|
| 2,066,672 | De Berard et al. | Jan. 5, 1937 |
| 2,277,207 | Chenoweth et al. | Mar. 24, 1942 |
| 2,572,596 | Camras | Oct. 23, 1951 |
| 2,690,480 | Logan | Sept. 28, 1954 |

UNITED STATES PATENT OFFICE

CERTIFICATE OF CORRECTION

Patent No. 2,800,531 July 23, 1957

Richard Kobler

It is hereby certified that error appears in the printed specification of the above numbered patent requiring correction and that the said Letters Patent should read as corrected below.

Column 3, line 75, for "Wann" read -- Dann --; column 5, line 50, for "end" read -- ends --; column 8, line 56, for "196" read -- 195 --; column 10, line 62, for "original" read -- originally --; column 13, line 26, for "of" read -- by --.

Signed and sealed this 4th day of April 1961.

(SEAL)
Attest: ERNEST W. SWIDER
~~KARL H. AXLINE~~
Attesting Officer

ARTHUR W. CROCKER
Acting Commissioner of Patents